United States Patent
Gaynor et al.

(10) Patent No.: US 9,351,606 B2
(45) Date of Patent: May 31, 2016

(54) KITCHEN APPLIANCE AND METHOD OF ASSEMBLING SAME

(75) Inventors: James Robert Gaynor, Glen Allen, VA (US); Mark C. Steiner, Glen Allen, VA (US); Brian Bock, Glen Allen, VA (US); John D. Barnes, Glen Allen, VA (US)

(73) Assignee: HAMILTON BEACH BRANDS, INC., Glen Allen, VA (US)

( * ) Notice: Subject to any disclaimer, the term of this patent is extended or adjusted under 35 U.S.C. 154(b) by 456 days.

(21) Appl. No.: 13/406,043

(22) Filed: Feb. 27, 2012

(65) Prior Publication Data

US 2012/0223067 A1 Sep. 6, 2012

Related U.S. Application Data

(63) Continuation-in-part of application No. 29/386,630, filed on Mar. 3, 2011, now Pat. No. Des. 657,611.

(51) Int. Cl.
*F27D 11/00* (2006.01)
*A47J 36/10* (2006.01)
*A47J 36/12* (2006.01)

(52) U.S. Cl.
CPC *A47J 36/10* (2013.01); *A47J 36/12* (2013.01); *Y10T 29/49947* (2015.01)

(58) Field of Classification Search
CPC ............ A47J 36/12; A47J 36/10; A47J 36/06
USPC ............ 219/438, 439, 433, 440; 99/403, 337, 99/421 HV, 424, 372, 376, 377, 379, 341
See application file for complete search history.

(56) References Cited

U.S. PATENT DOCUMENTS

| | | | | |
|---|---|---|---|---|
| 1,661,294 | A | * 3/1928 | Lemaster | 99/376 |
| 1,698,928 | A |   1/1929 | Wentorf | |
| 1,837,232 | A | * 12/1931 | Reinhardt | 16/361 |
| 1,866,874 | A | * 7/1932 | Barnes et al. | 99/379 |
| D129,108 | S |   8/1941 | Sprague | |
| 3,577,908 | A |   5/1971 | Burg | |
| 3,769,899 | A |   11/1973 | Kostko | |
| 3,791,368 | A |   2/1974 | Hunt | |
| 3,801,331 | A | * 4/1974 | Sano et al. | 99/403 |

(Continued)

FOREIGN PATENT DOCUMENTS

| | | |
|---|---|---|
| CH | 245961 A | 12/1946 |
| DE | 311246 | 5/1916 |

(Continued)

*Primary Examiner* — Tu B Hoang
*Assistant Examiner* — Alba Rosario-Aponte
(74) *Attorney, Agent, or Firm* — Panitch Schwarze Belisario & Nadel LLP

(57) ABSTRACT

A kitchen appliance includes a housing with a base, a side wall and a cavity. The housing has a housing rim defining an opening to the cavity. A hinge base is mounted to the side wall. A container has a generally hollow interior and a container rim defining an opening. The container fits within the cavity of the housing. A lid at least partially covers the opening of the container when placed on the container rim. The lid has an exterior surface, and an opposing interior surface facing the interior of the container when the lid is placed on the container rim. A bracket is mounted to the exterior surface of the lid. At least a portion of the bracket is rotatably and selectively removably received within at least a portion of the hinge base to rotatably and selectively removable mount to the lid of the housing.

16 Claims, 8 Drawing Sheets

(56) References Cited

U.S. PATENT DOCUMENTS

| | | | |
|---|---|---|---|
| 3,842,725 A | 10/1974 | Sano et al. | |
| 4,148,250 A * | 4/1979 | Miki et al. | 99/403 |
| 4,315,139 A * | 2/1982 | Onishi et al. | 219/441 |
| 4,375,711 A | 3/1983 | Franzen et al. | |
| 4,492,853 A | 1/1985 | Lam | |
| 4,617,452 A * | 10/1986 | Miwa | 219/441 |
| D298,899 S | 12/1988 | Blum et al. | |
| 4,847,949 A | 7/1989 | Goad et al. | |
| D307,531 S | 5/1990 | Ishida | |
| D313,727 S | 1/1991 | Gamez | |
| 5,046,633 A | 9/1991 | Chung | |
| 5,097,107 A | 3/1992 | Watkins et al. | |
| 5,129,314 A | 7/1992 | Hu | |
| D338,370 S | 8/1993 | Takeda | |
| D341,058 S | 11/1993 | Slany et al. | |
| 5,337,910 A | 8/1994 | Picozza et al. | |
| 5,415,082 A | 5/1995 | Nagao | |
| 5,429,039 A * | 7/1995 | Chang | 99/331 |
| 5,472,271 A * | 12/1995 | Bowers et al. | 312/329 |
| D370,826 S | 6/1996 | Thurlow | |
| 5,632,403 A * | 5/1997 | Deng | 220/573.4 |
| 5,643,481 A | 7/1997 | Brotzki et al. | |
| 5,678,790 A | 10/1997 | Dwyer | |
| 5,683,010 A | 11/1997 | Boyajian, Jr. | |
| 5,829,342 A | 11/1998 | Lee | |
| 5,834,046 A | 11/1998 | Turpin et al. | |
| 5,951,899 A | 9/1999 | Eichler et al. | |
| 5,957,323 A | 9/1999 | Terracciano et al. | |
| D416,434 S | 11/1999 | Pollnow | |
| 6,002,111 A | 12/1999 | Beugnot et al. | |
| D420,246 S | 2/2000 | Alonge et al. | |
| 6,032,822 A | 3/2000 | Munari | |
| D425,360 S | 5/2000 | Dobson et al. | |
| D427,483 S | 7/2000 | Geelen et al. | |
| D429,596 S | 8/2000 | Hlava et al. | |
| 6,102,238 A | 8/2000 | Brady et al. | |
| 6,105,810 A | 8/2000 | Daenen et al. | |
| 6,129,234 A | 10/2000 | Culig et al. | |
| D434,266 S | 11/2000 | Dobson et al. | |
| D434,940 S | 12/2000 | Hlava et al. | |
| 6,172,339 B1 | 1/2001 | Thevenin | |
| 6,175,105 B1 | 1/2001 | Rubbright et al. | |
| 6,234,067 B1 | 5/2001 | Schmidt | |
| D444,664 S | 7/2001 | Dobson et al. | |
| D444,993 S | 7/2001 | Dobson et al. | |
| 6,262,398 B1 | 7/2001 | Busquets et al. | |
| 6,429,408 B2 | 8/2002 | Muskalla et al. | |
| 6,435,358 B1 | 8/2002 | Decal | |
| D468,163 S | 1/2003 | Blake et al. | |
| 6,571,975 B1 | 6/2003 | Fay | |
| 6,601,726 B2 | 8/2003 | Bianco et al. | |
| 6,705,209 B2 | 3/2004 | Yang et al. | |
| 6,748,853 B1 | 6/2004 | Brady et al. | |
| D492,882 S | 7/2004 | Liu | |
| D496,555 S | 9/2004 | Rommelfanger et al. | |
| 6,802,429 B1 | 10/2004 | Wildman | |
| 6,872,921 B1 | 3/2005 | DeCobert et al. | |
| D503,584 S | 4/2005 | White et al. | |
| 6,884,971 B2 | 4/2005 | Li | |
| D506,350 S | 6/2005 | Cheng | |
| D507,452 S | 7/2005 | Chan | |
| D507,718 S | 7/2005 | Kellermann et al. | |
| D508,817 S | 8/2005 | Kellermann et al. | |
| 6,987,247 B2 | 1/2006 | Schaffeld et al. | |
| 6,998,581 B2 | 2/2006 | Currie | |
| 7,175,041 B2 | 2/2007 | Ekkert | |
| 7,485,831 B2 * | 2/2009 | Tynes et al. | 219/433 |
| 7,789,015 B2 * | 9/2010 | Crow et al. | 99/403 |
| 2003/0024936 A1 | 2/2003 | Niese | |
| 2004/0079747 A1 | 4/2004 | Wang | |
| 2005/0145615 A1 | 7/2005 | Schaffeld et al. | |
| 2005/0167435 A1 | 8/2005 | Whitmer | |
| 2010/0251902 A1 | 10/2010 | Schandel et al. | |

FOREIGN PATENT DOCUMENTS

| | | |
|---|---|---|
| DE | 301471 C | 1/1917 |
| DE | 2934215 A1 | 4/1981 |
| FR | 1024229 A | 3/1953 |
| GB | 1446895 A | 8/1976 |

* cited by examiner

KITCHEN APPLIANCE AND METHOD OF ASSEMBLING SAME

CROSS-REFERENCE TO RELATED APPLICATIONS

The present application is a continuation-in-part (CIP) of U.S. Design patent application No. 29/386,630, filed Mar. 3, 2011 and entitled "Lid Latch."

BACKGROUND OF THE INVENTION

The present disclosure relates generally to a kitchen appliance and, more particularly, to a slow cooker that can be easily transported with little or no spillage of any contents therein.

Kitchen appliances, and particularly slow cookers, are well known. Conventional slow cookers are generally sized and shaped to allow a user to pick-up and move or transport the slow cooker from one location to another. Often, the user may want to move the slow cooker after it is loaded with foodstuff to be cooked.

However, it can be difficult to move or transport conventional slow cookers when foodstuff, particularly liquid, has been placed therein without spilling some of the foodstuff. The components of conventional slow cookers are not made to close tolerances, and any lid of a conventional slow cooker is typically not securely engaged with a container of the slow cooker when in a closed position. This creates a potential for the lid to inadvertently slide off the container when the slow cooker is being carried from one location to another. Also, because foodstuff cooked in a slow cooker, such as soup, chili, stew, etc., typically has a significant liquid content, there exists the potential of significant spillage if the slow cooker is tilted during transport. In addition, it can be difficult to find a location to temporarily place the lid once it has been removed from the container of a slow cooker, as users want to be sure that the lid is not misplaced or lost, and that the lid will not collect dirt or grime.

Therefore, it would be desirable to provide a kitchen appliance with a sealing lid that can be retained on a container thereof to inhibit leakage of foodstuff from within the container, and which can also be pivoted away from the container when the user desires to access an interior of the container. It would further be desirable to provide a kitchen appliance having a sealing lid that remains attached to at least a portion of the kitchen appliance when in an open position, but can also be selectively completely removed or separated from the kitchen appliance when desired. It would be desirable to provide a kitchen appliance that allows for adjustment of a pivoting mechanism of the lid so that tolerances between the lid and the container can be adjusted, if desired. It would also be desirable to provide a kitchen appliance having a lid that is pivotally attached thereto and a latching mechanism that allows a user to selectively lock the lid onto the container in a closed position. The device of the present disclosure accomplishes the above objectives.

BRIEF SUMMARY OF THE INVENTION

Briefly stated, a preferred embodiment of the present disclosure is directed to a kitchen appliance having a housing with a base and side wall extending therefrom. The side wall has an exterior surface and an opposing interior surface defining, with the base, a cavity within the housing. The housing has a housing rim at a first, free edge of the side wall defining an opening to the cavity. A container has a generally hollow interior and a container rim defining an opening for accessing the interior thereof. The interior of the container is capable of retaining foodstuffs therein. The container is sized and shaped to fit within the cavity of the housing. A lid is sized and shaped to at least partially cover the opening of the container when placed on the container rim. The lid has an exterior surface, and an opposing interior surface facing the interior of the container when the lid is placed on the container rim. A hinge base is mounted to one of the exterior surface of the side wall of the housing and the exterior surface of the lid. A bracket is mounted to one of the exterior surface of the lid and the exterior surface of the side wall of the housing. At least a portion of the bracket is rotatably and selectively removably received within at least a portion of the hinge base to rotatably and selectively removably mount to the lid of the housing.

In another aspect, a preferred embodiment of the present disclosure is directed to a kitchen appliance having a housing with a base and a side wall extending therefrom. The side wall has an exterior surface and an opposing interior surface defining, with the base, a cavity within the housing. The housing has a housing rim at a first, free edge of the side wall defining an opening to the cavity. The side wall includes at least two laterally spaced-apart vertically-elongated slots in the exterior surface thereof. A container has a generally hollow interior and a container rim defining an opening for accessing the interior thereof. The interior of the container is capable of retaining foodstuffs therein. The container is sized and shaped to fit within the cavity of the housing. A hinge base is mounted to the side wall of the housing and has at least two laterally spaced-apart mounting holes extending therethrough. Each mounting hole corresponds to one of the slots in the side wall of the housing. A lid is sized and shaped to at least partially cover the opening of the container when placed on the container rim. The lid has an exterior surface and an opposing interior surface facing the interior of the container when the lid is placed on the container rim. A bracket is mounted to the exterior surface of the lid. At least a portion of the bracket engages at least a portion of the hinge base to rotatably mount the lid to the container rim. A fastener extends through each corresponding mounting hole and slot to secure the hinge base to the side wall of the housing. The vertically-elongated slots are sized and shaped to permit vertical adjustment to the hinge base with respect to the side wall of the housing.

In another aspect, a preferred embodiment of the present disclosure is directed to a kitchen appliance having a housing with a base and a side wall extending therefrom. The side wall has an exterior surface and opposing interior surface defining a cavity within the housing. The housing has a housing rim at a first, free edge of the side wall defining an opening to the cavity. A container has a generally hollow interior and a container rim defining an opening for accessing the interior thereof. The interior is capable of retaining foodstuffs therein. The container is sized and shaped to fit within the cavity of the housing. A lid is sized and shaped to at least partially cover the container when placed on the container rim. The lid has an exterior surface and an opposing interior surface facing the interior of the container when the lid is placed on the container rim. A gasket extends around one of an outer edge of the lid and the container rim. A hinge base is mounted to one of the exterior surface of the side wall of the housing and the exterior surface of the lid. A bracket is mounted to one of the exterior surface of the lid and the exterior surface of the side wall of the housing. At least a portion of the bracket engages at least a portion of the hinge base for pivoting the lid with respect to the container rim. A latching mechanism is mounted to one of the side wall of the housing opposite to the hinge base and an end of the bracket opposite the hinge base.

The latching mechanism is an over-the-center clip having at least hook and a latch. The latching mechanism has an engaged position in which the gasket is in sealing engagement with at least one of the lid and the container rim to inhibit leakage of the foodstuffs from the interior of the container and a disengaged position in which the latching mechanism permits the lid to be removed from the container rim.

In yet another aspect, a preferred embodiment of the present disclosure is directed to a method of assembling a kitchen appliance including a housing having a base and a side wall extending therefrom. The side wall has an exterior surface and an opposing interior surface defining a cavity within the housing. At least one vertically-elongated slot is located in the exterior surface of the side wall of the housing. A container has a generally hollow interior and a container rim defining an opening for accessing the interior thereof. The interior is capable of retaining foodstuffs therein. A lid is sized and shaped to at least partially cover the opening of the container when placed on the container rim. The lid has an exterior surface and an opposing interior surface facing the interior of the container when the lid is placed on the container rim. A bracket is mounted to the exterior surface of the lid. A handle is located on one of an end of the bracket and the side wall of the housing. A hinge base is mounted to the exterior surface side wall of the housing for pivotally mounting the lid to the housing. A latching mechanism is mounted to one of the side wall of the housing and an end of the bracket opposite the hinge base. The method includes inserting the container into the cavity of the housing, inserting at least a portion of the bracket into at least a portion of the hinge base, and placing the lid on the container rim. The method also includes adjusting the vertical position of the hinge base with respect to the side wall of the housing so the lid fully engages the container rim and inserting at least one fastener through the hinge base and into the at least one vertically-elongated slot in the side wall of the housing to properly align the handle with the latching mechanism.

BRIEF DESCRIPTION OF THE SEVERAL VIEWS OF THE DRAWINGS

The foregoing summary, as well as the following detailed description of a preferred embodiment of the disclosure, will be better understood when read in conjunction with the appended drawings. For the purpose of illustrating the disclosure, there is shown in the drawings an embodiment which is presently preferred. It should be understood, however, that the disclosure is not limited to the precise arrangements and instrumentalities shown. In the drawings.

DETAILED DESCRIPTION OF THE DISCLOSURE

Figure 1:
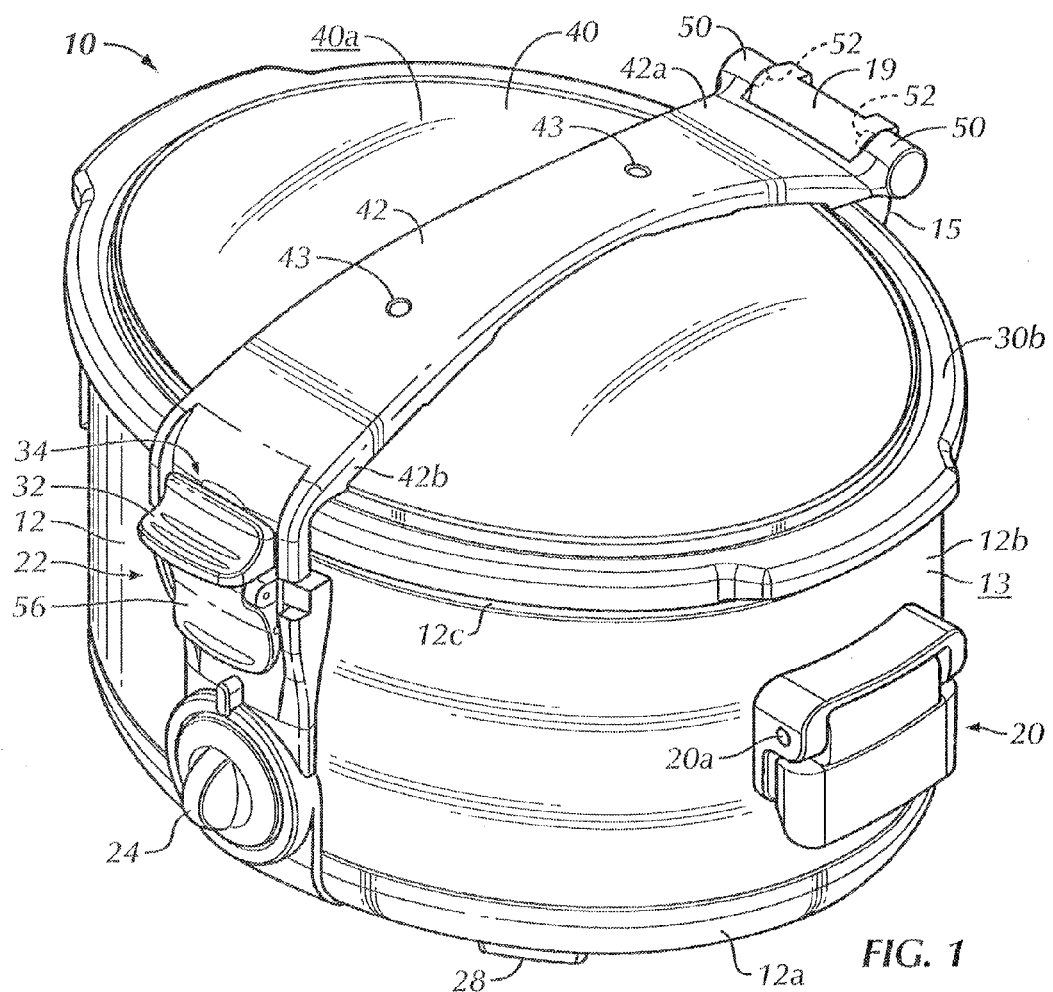
FIG. 1 is a top perspective view of a kitchen appliance in accordance with a preferred embodiment of the present disclosure.

Certain terminology is used in the following description for convenience only and is not limiting. The words "lower," "bottom," "upper," "top," "front," "back" and "rear" designate directions in the drawings to which reference is made. The words "inwardly" and "outwardly" refer to directions toward and away from, respectively, the geometric center of the kitchen appliance, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-8 show a preferred embodiment of a kitchen appliance, generally indicated at 10. The kitchen appliance 10 is preferably a slow cooker for warming and/or cooking (collectively referred to as heating) foodstuff (not shown). However, the present disclosure is not limited to such a device or functionality. For example, the kitchen appliance 10 may be any of a variety of devices typically used in a kitchen, such as a deep fryer or a roaster oven. In fact, the kitchen appliance 10 could be any type of device having a lid and a container, as described in detail below.

Referring to FIGS. 1-4 and 6-8, the kitchen appliance 10 includes a housing 12 having a base 12*a* and a side wall 12*b* extending therefrom to define a heating cavity within the housing 12. Preferably, the base 12*a* is generally ovular or elliptical in shape when viewed from above or below (see FIG. 5) with the side wall 12*b* extending generally perpendicularly upwardly therefrom (see FIG. 2). While the ovular or elliptical shape is preferred, the base 12*a* may have a different shape, such as, but not limited to, circular in plan view. The side wall 12*b* includes an exterior surface 13 that faces the external environment and an opposing interior surface (not shown) that surrounds and establishes the heating cavity. The housing 12 also has a housing rim 12*c* at an upper first, free edge of the side wall 12*b* defining an opening to the heating cavity. Preferably, the base 12*a* includes several generally spaced-apart, rounded protrusions or feet 28 extending downwardly from a bottom surface thereof for supporting the kitchen appliance 10 on a support surface 11 (see FIG. 2), such as a countertop, and preferably spacing the bottom surface of the base 12*a* at least slightly above the support surface 11. Alternatively, it is contemplated that the kitchen appliance 10 include no feet, such that the kitchen appliance 10 be supported by the bottom surface of the base 12*a* directly on the support surface 11.

Figure 2:
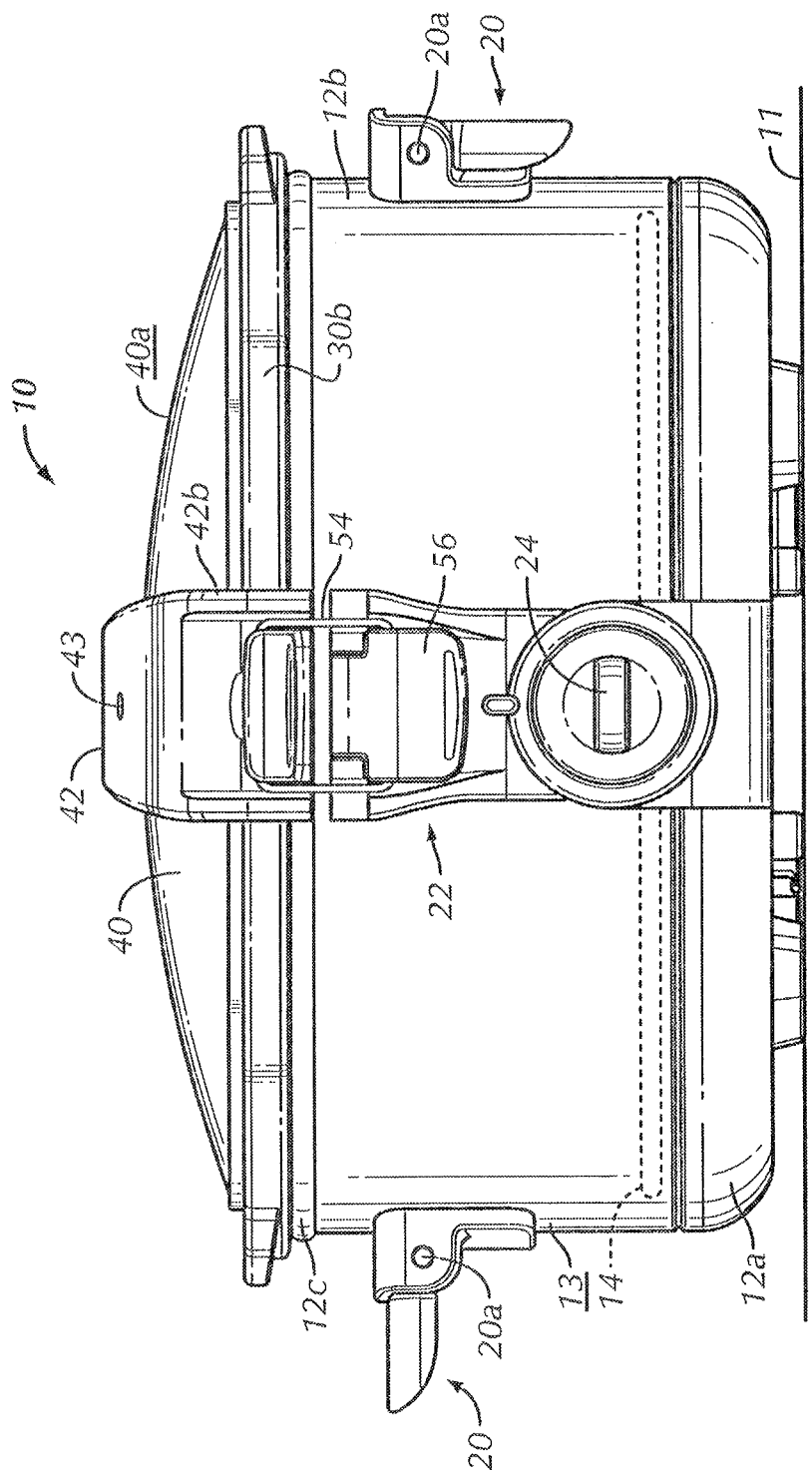
FIG. 2 is a front elevational view thereof.
Figure 5:
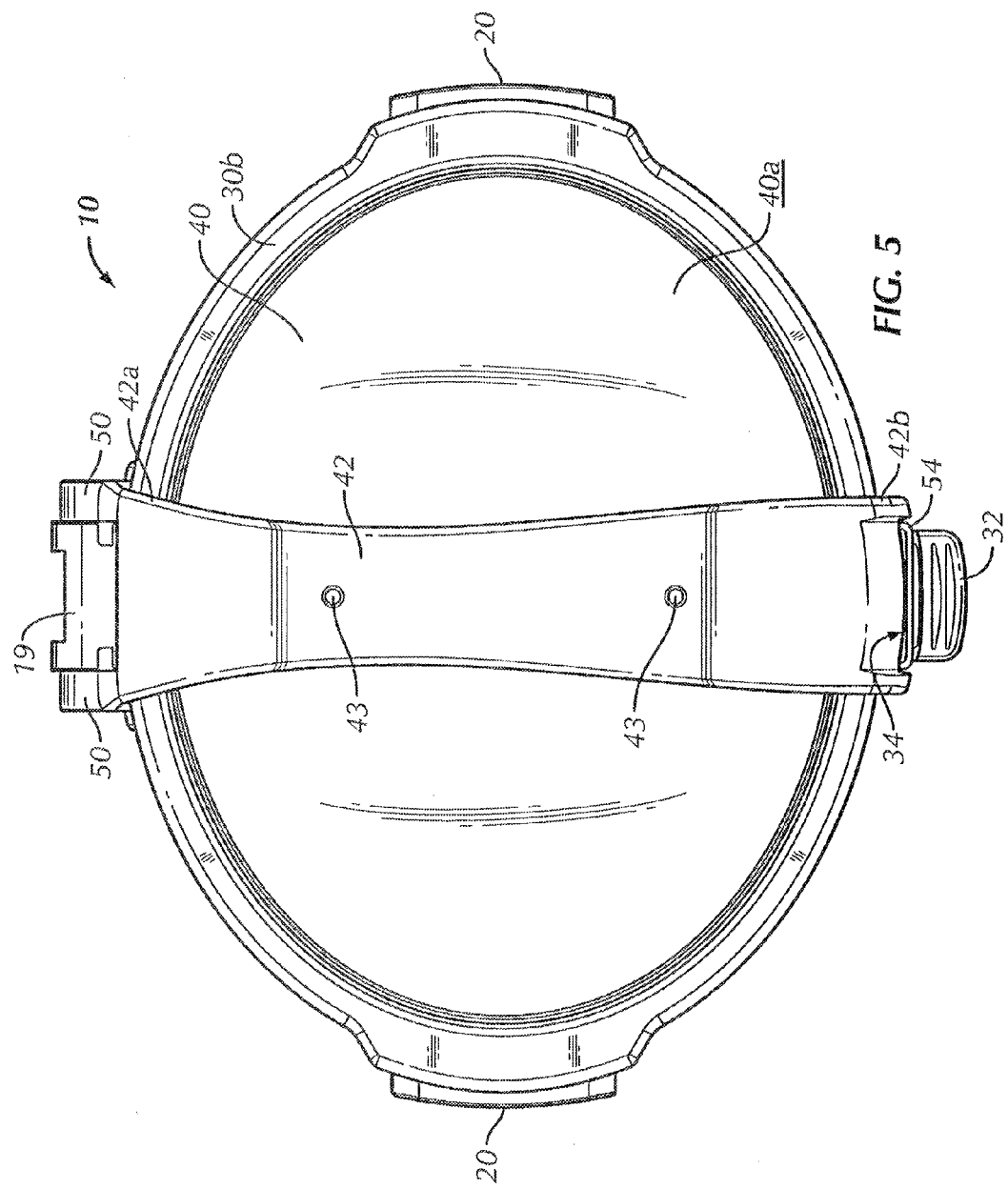
FIG. 5 is a top plan view thereof.
Figure 8:
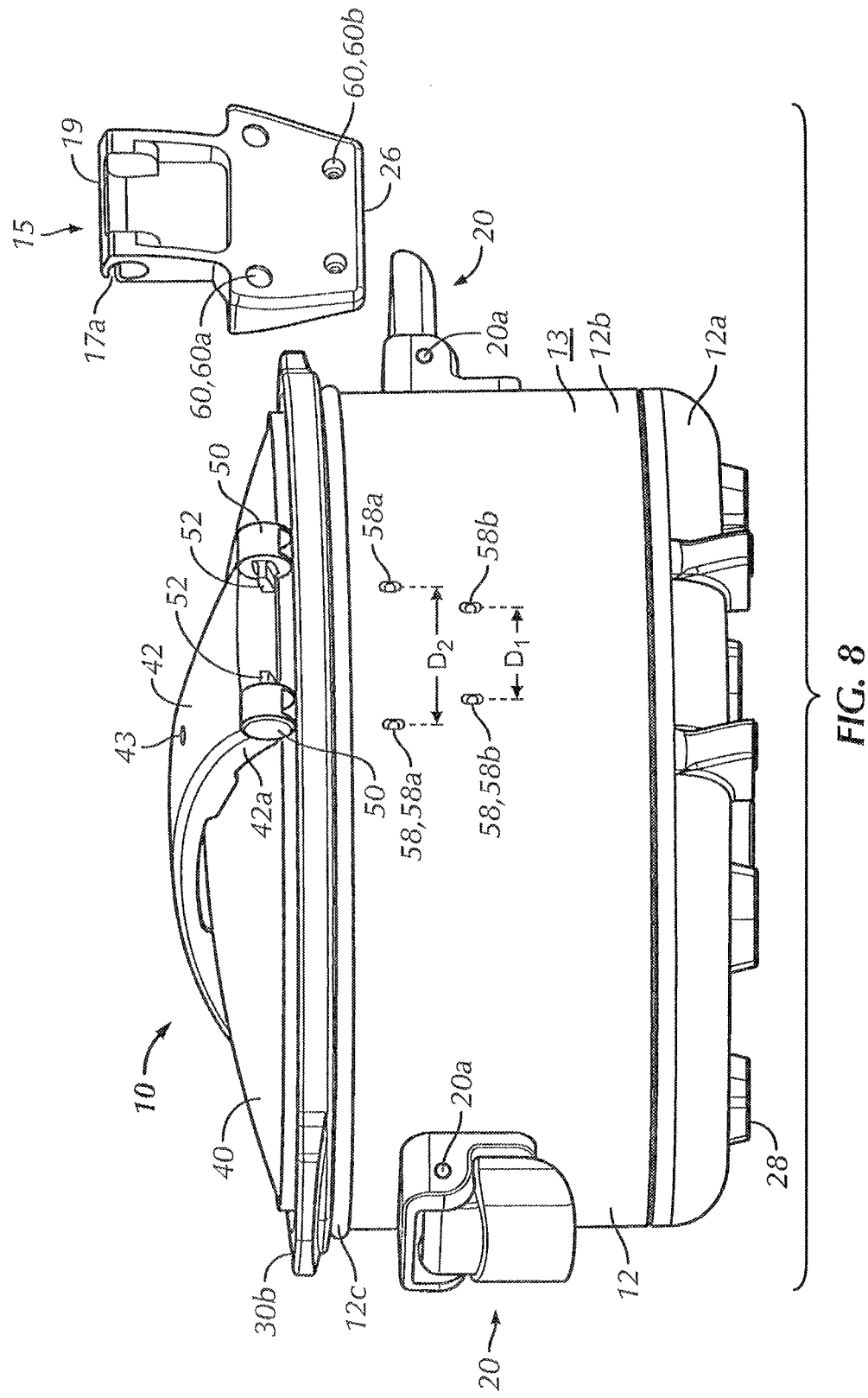
FIG. 8 is still another perspective view of the kitchen appliance of FIG. 1, with the hinge base shown removed and spaced-apart from a remainder of the kitchen appliance.

Two handles 20 preferably extend outwardly from opposing portions of the exterior surface 13 of the side wall 12*b* of the housing 12 to enable a user to grasp and lift the kitchen appliance 10 for movement thereof. Preferably, as shown in FIG. 5, the handles 20 are in diametrically opposed relation to one another and are disposed along a major axis of the housing 12. As shown in FIGS. 2 and 8, at least a portion of each handle 20 is preferably pivotally attached to the side wall 12*b* of the housing 12, so that the handles 20 can at least partially fold or collapse to reduce the outer width of the kitchen appliance 10 for storage purposes. More specifically, each handle 20 preferably includes a pin 20*a* having a longitudinal axis that extends generally parallel to the support surface 11 when the kitchen appliance 10 is placed thereon. At least one portion of each handle 20 is preferably fixed to the side wall 12*b* of the housing 12, and another portion of each handle 20 is preferably pivotable about the pin 20*a*. At least some of the components of the housing 12 and/or kitchen appliance 10 are preferably formed from one or more metallic materials, such as aluminum, stainless steel, or another suitable metallic material, or some combination of metallic materials. However, one or more of the components, and preferably the handles 20, may be formed from other, non-metallic materials, such as a polymeric or ceramic material, provided the housing 12 and/or kitchen appliance 10 is capable of functioning as described herein.

Figure 6:
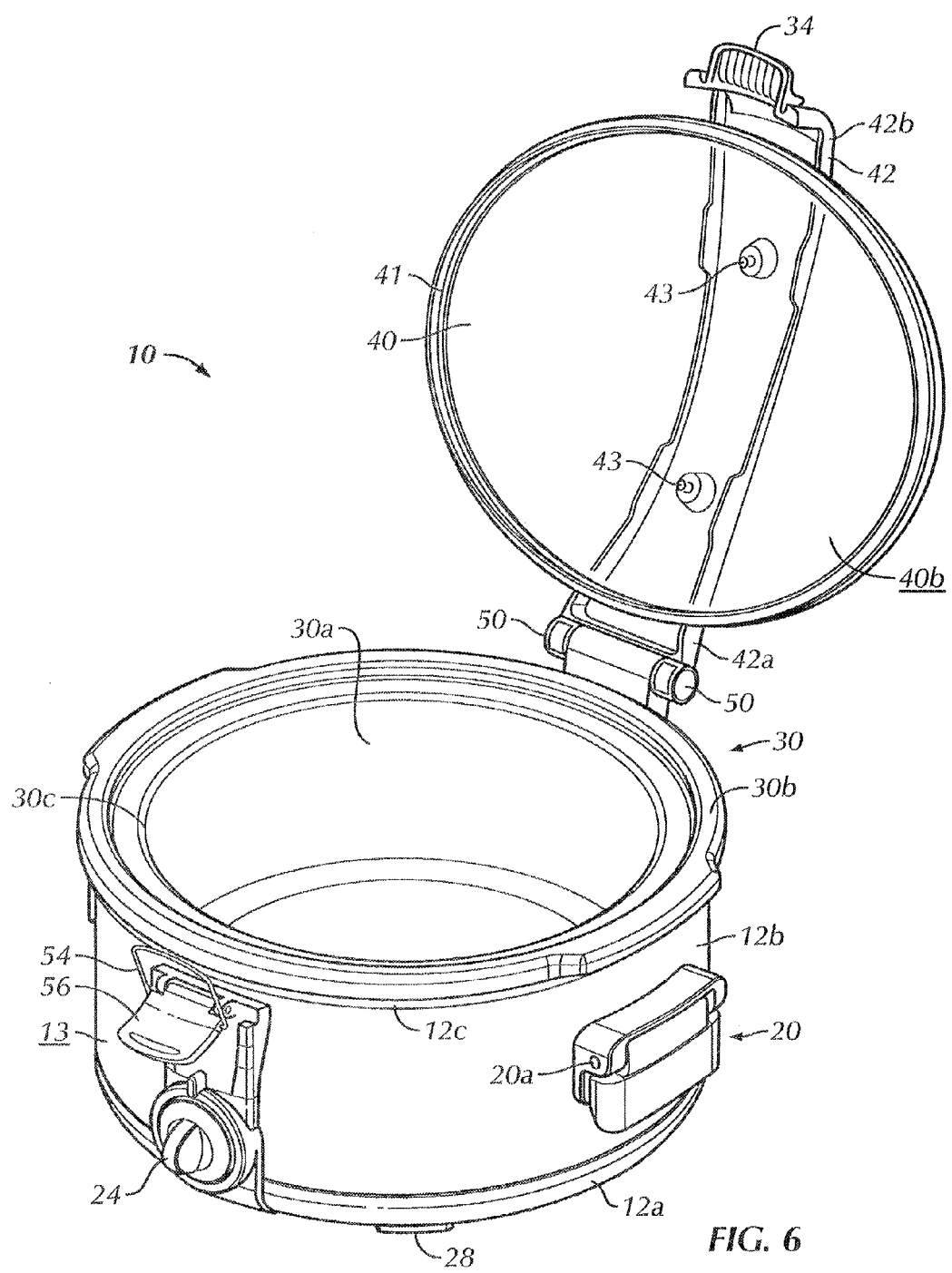
FIG. 6 is another top perspective view thereof, with a lid and a bracket shown in an open position.
Figure 7:
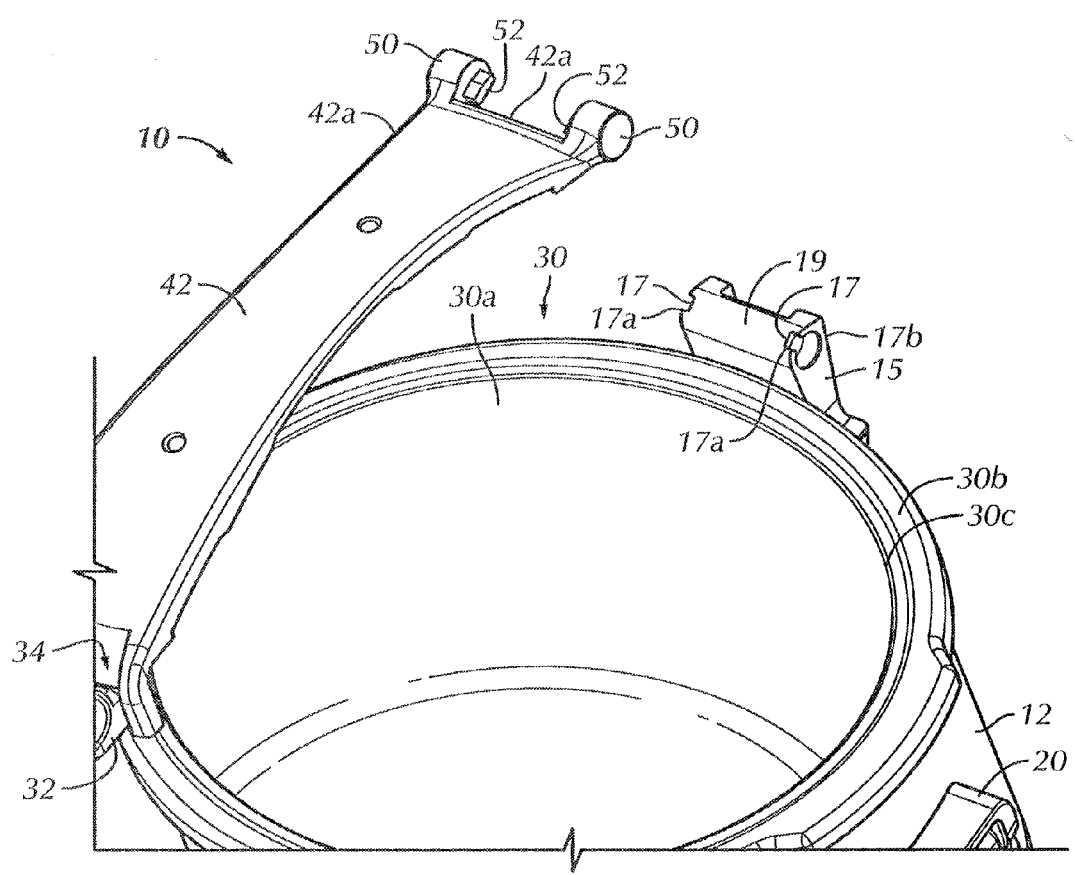
FIG. 7 is yet another top perspective view of a portion of the kitchen appliance of FIG. 1, with the bracket shown removed and spaced-apart from a hinge base, wherein the lid is not shown for clarity.

As shown in FIGS. 1 and 3-8, the kitchen appliance 10 includes a hinge base 15 preferably mounted to the side wall 12*b* of the housing 12. Alternatively, the hinge base 15 may be integrally formed with the housing 12. The hinge base 15 is preferably positioned generally equidistantly between both handles 20 on the side wall 12*b* of the housing 12 (see FIG. 5). At least a first or upper portion 19 of the hinge base 15 preferably extends above the housing rim 12*c* when the hinge base 15 is attached to the side wall 12*b* (see FIGS. 3 and 4). As shown in FIG. 7, the first portion 19 is preferably at least partially in the form of a cylinder and includes at least one and preferably two laterally spaced-apart channels 17 on opposing exterior side walls of the hinge base 15. Each channel 17 preferably includes an opening or slot 17*a* that extends to a preferably generally circular portion 17*b* within the first portion 19 of the hinge base 15. The slot 17*a* is preferably positioned proximate a top of the first portion 19, and the generally circular portion 17*b* extends into an interior of the hinge base 15. The generally circular portion 17*b* includes a generally continuously arcuate side wall, with the exception of where the slot 17*a* connects to the generally circular portion 17*b*. As shown in FIGS. 7 and 8, each slot 17*a* is preferably at least slightly radially offset or radially spaced-apart from a top surface of the first portion 19.

Figure 3:
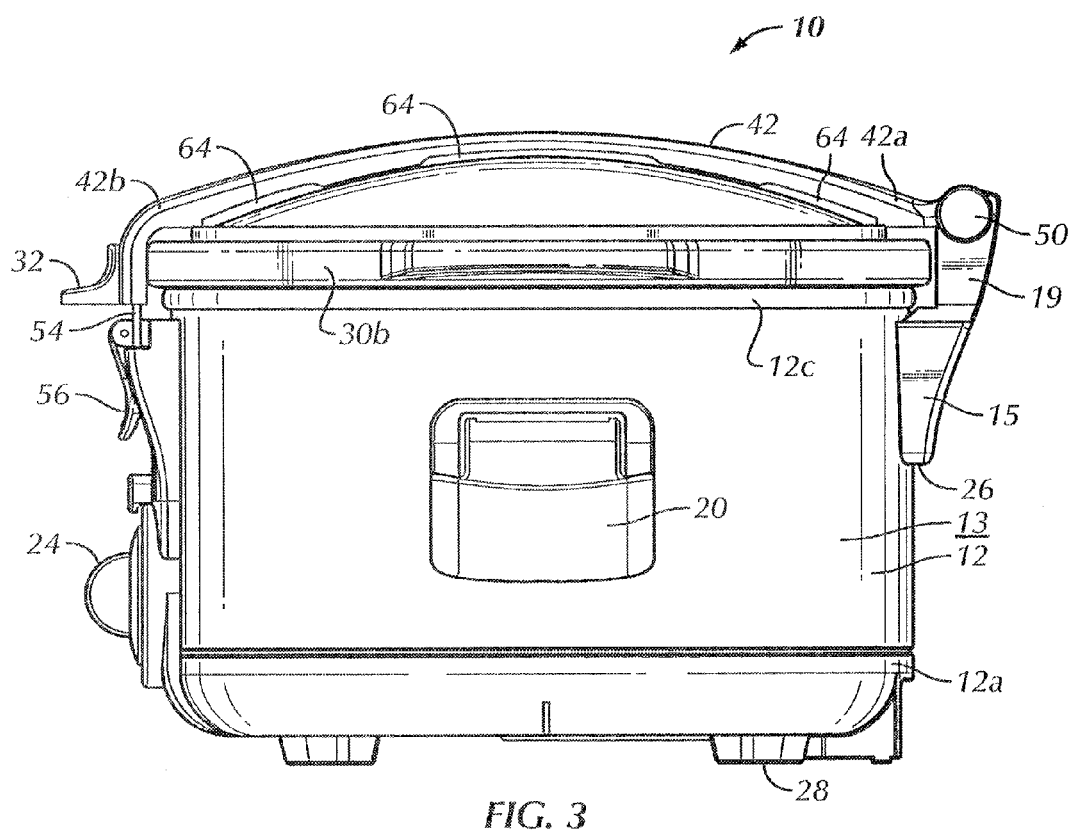
FIG. 3 is a left side elevation view thereof.
Figure 4:
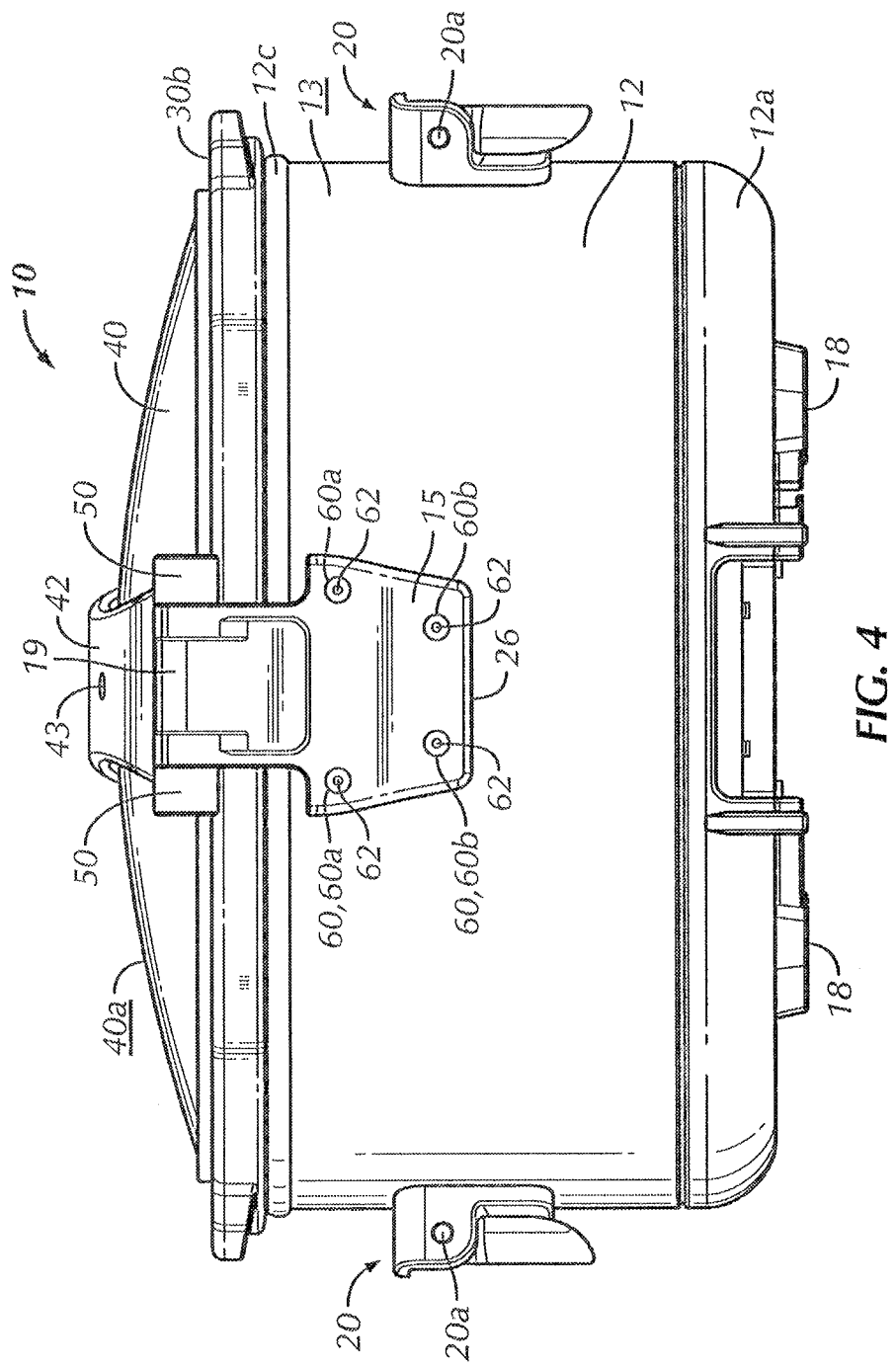
FIG. 4 is a rear elevation view thereof.

A second or lower portion 26 of the hinge base 15, which is opposite the first portion 19, is preferably spaced a predetermined distance above the base 12*a* of the housing 12 when the hinge base 15 is attached to the housing 12 (see FIGS. 3 and 4). Further, an inner surface of the hinge base 15 is preferably at least slightly arcuate, so as to closely conform to at least the portion of the exterior surface of the side wall 12*b* of the housing 12 to which the hinge base 15 is attached. As shown in FIG. 3, the hinge base 15 preferably has a predetermined thickness that varies along a vertical axis of the hinge base 15. As shown in FIGS. 3 and 5, as a result of the predetermined thickness, at least a portion of the hinge base 15 preferably extends laterally outwardly beyond an outer periphery of a lid 40 when the lid is placed on a container rim 60*b*, as described in detail below.

As shown in FIG. 8, the side wall 12*b* of the housing 12 preferably includes at least one slot 58 in the exterior surface 13 thereof. More specifically, the side wall 12*b* of the housing 12 preferably includes at least two laterally spaced-apart and more preferably four spaced-apart slots 58 therein. In one preferred embodiment shown in FIG. 8, two upper slots 58*a* are laterally spaced-apart at a distance $D_2$ which is greater than a distance $D_1$ establishing the spacing of the two lower slots 58*b*. Further, the two upper slots 58*a* and preferably located closer to the housing rim 12*c* on the side wall 12*b* of the housing 12 than the two lower slots 58*b*. Each slot 58 is preferably oval in shape and preferably vertically-elongated, such that a height of each slot 58 is preferably greater than a width thereof. Each slot 58 may be located generally equidistantly between each handle 20, but the kitchen appliance 10 is not so limited.

As shown in FIGS. 4 and 8, the hinge base 15 preferably includes at least one mounting hole 60 extending completely therethrough. More specifically, the hinge base 15 preferably includes at least two and more preferably four spaced-apart mounting holes 60. Unlike each slot 58, it is preferred that each mounting hole 60 is circular in shape. The four mounting holes 60 of the hinge base 15 preferably correspond to the four spaced-apart slots 58 of the housing 12, such that two upper mounting holes 60*a* are laterally spaced-apart at a greater distance than the two lower mounting holes 60*b*. Each mounting hole 60 and slot 58 are preferably sized and shaped to receive a fastener 62 therein and/or therethrough to securely and removably attach the hinge base 15 to the housing 12. Each slot 58 is preferably vertically-elongated to allow for or permit vertical adjustment of the hinge base 15 with respect to the side wall 12*b* of the housing 12. Thus, the slots 58 allow for variances in the vertical positioning of the hinge base 15 on the housing 12 during manufacturing and/or assembly of the kitchen appliance 10. More specifically, the elongated shape of each slot 58 allows for relatively minor variances in the positioning of the hinge base 15 to assuring proper positioning of the hinge base 15 and a bracket 42, as described in detail below, with respect to the housing 12 and the lid 40. In other words, the shape of the slots 58 allow the hinge base 15 to be moved up or down with respect to the side wall 12*b* of the housing 12. As a result, at least manufacturing costs can be reduced, as exact tolerances do not need to be observed or conformed to for each portion of the kitchen appliance 10.

Referring specifically to FIG. 2, a heating element 14 is disposed within the housing 12 sufficiently proximate the heating cavity to heat the heating cavity. The heating element 14 may be disposed within the base 12*a* of the housing 12, or the heating element 14 may be located within or on the interior surface of the side wall 12*b* of the housing 12 in addition to or instead of the base 12*a*. The heating element 14 is preferably electrically powered and is a resistance-type heating element, such as a calrod or mica board heating element. However, a different type of heating element may be used, provided the heating element functions to heat the heating cavity of the housing 12. Additionally or alternatively, the heating element 14 may function as a cooling element.

Preferably, a control knob 24 extends outwardly from the side wall 12*b* of the housing 12 to enable a user to control the heating element 14. For instance, it is preferred that rotation of the knob 24 by a user toggles the heating element 14 between at least one "on" setting and an "off" setting. It is further preferred that the heating element 14 have at least two on settings, specifically a "high" heat setting and a "low" heat setting. Although two heat settings are preferred, it is further contemplated that alternate configurations may be used, such as, but not limited to, rotation of the knob 24 actuating a thermostat (not shown) to cause the heating element 14 to heat and/or cool the heating cavity to a specific user selected temperature.

Referring to FIGS. 6 and 7, the kitchen appliance 10 further includes a container 30 having a generally hollow interior 30*a* and the container rim 30*b* defining an opening 30*c* for accessing the interior 30*a*. The interior 30*a* is capable of retaining the foodstuffs therein. The container 30 is preferably shaped and sized to fit within the heating cavity of the housing 12 for heating thereof by the heating element 14. More specifically, an exterior of the container 30 is preferably at least slightly smaller than the interior of the heating cavity of the housing 12, such that at least a majority of the container 30 can fit within the heating cavity. The container 30 is preferably made of stoneware or ceramic. However, the container 30 may be made of a different material, such as cast iron with a porcelain enamel coating, for instance, provided the container 30 is capable of functioning as described herein. Additionally, it is preferable that the container 30 be easily removable from the housing 12 to facilitate cleaning thereof without exposing the housing 12, and specifically the heating element 14 and other electrical components thereof, to water and/or cleaning detergents or solvents.

Referring to FIGS. 1-6 and 8, the kitchen appliance 10 further includes the lid 40 sized and shaped to at least partially and preferably completely cover the opening 30c of the container 30 when the lid 40 is placed on the container rim 30b. The lid 40 includes a top or exterior surface 40a and an opposing bottom or interior surface 40b (FIG. 6) that faces the interior 30a of the container 30 when the lid 40 is placed on the container rim 30b. Preferably, the lid 40 has at least a slightly arcuate shape, such that the exterior surface 40a is generally convex and the interior surface 40b is generally concave. The lid 40 is preferably generally ovular or elliptical when viewed from above or below to correspond to the shape of the opening 30c of the container 30. Preferably, when placed on the container rim 30b, the lid 40 entirely covers the opening 30c of the container 30 such that an entire periphery of the lid 40 engages the container rim 30b. The lid 40 is preferably predominantly made of glass, although the lid 40 may be made of a different, preferably transparent or translucent material, such as a polymeric material, for instance, provided the lid 40 functions as described herein. The lid 40 may include a gasket 41 (see FIG. 6), as disclosed in U.S. Pat. No. 7,947,928, which is herein incorporated by reference, to sealingly engage the lid 40 with the container rim 30b when the lid 40 is placed thereon. When the lid 40 is removed from the container rim 30b, the gasket 41 may be placed around and/or attached to an outer edge or periphery of the lid 40, or the gasket 41 may be placed around and/or attached to the container rim 30b. In an alternative preferred embodiment, the lid 40 may include the slots 58 instead of or in addition to the slots 58 in the exterior surface 13 of the side wall 12b of the housing 12.

Referring to FIGS. 1-8, the lid 40 preferably includes a bracket 42 mounted on the exterior surface 40a thereof. The bracket 42 is preferably disposed generally perpendicular to a major axis of the lid 40, but the present disclosure is not so limited. The bracket 42 preferably includes a first end 42a and an opposing second end 42b. As shown in FIGS. 3 and 8, the bracket 42 is preferably arcuate and has a first radius of curvature that generally matches the convexity or a radius of curvature of the exterior surface 40a of the lid 40. The first end 42a of the bracket 42 preferably extends outwardly beyond an outer periphery of the lid 40 at a first location when the lid 40 is placed on the container rim 30a, and the second end 42b of the bracket 42 preferably extends outwardly beyond the outer periphery of the lid 40 at a second location diametrically opposed to the first location. Thus, the bracket 42 preferably extends across an entire width of the lid 40 from one end to an opposing end. As shown in FIGS. 1 and 3, at least a portion of the bracket 42 at the second end 42b is preferably at least slightly arcuate or curved and has a second radius of curvature, such as to extend around the outer side surface of the container rim 30b and/or the housing rim 12c when the kitchen appliance 10 is in a fully assembled configuration (FIGS. 1 and 3). The second radius of curvature of the second end 42b of the bracket 42 is preferably less than the first radius of curvature of the bracket 42.

As shown in FIGS. 7 and 8, the first end 42a of the bracket 42 preferably includes at least one and more preferably two laterally spaced-apart extensions 50 that extend outwardly therefrom. Each extension 50 preferably includes a projection 52 on an interior side wall thereof. In the preferred embodiment, each projection 52 is smaller than its respective extension 50 so as to be insertable into one of the slots 17a of the channels 17 of the hinge base 15. Thus, a width of each slot 17a is preferably at least slightly greater than a width of each projection 52. While it is preferred that the projections 52 are mounted on the bracket 42 on the lid 40 and the channels 17 are formed within the hinge base 15, it is understood by those skilled in the art that these features could be reversed, such that projections of the hinge base 15 engage channels of the bracket 42. Furthermore, in an alternative preferred embodiment, the bracket 42 may be mounted to the exterior surface 13 of the side wall 12b of the housing 12 and the hinge base 15 may be mounted to the exterior surface 40a of the lid 40.

Referring to FIGS. 1-3, 5 and 6, the second end 42b of the bracket 42 preferably includes a handle 32. A groove 34 is preferably located in or on the handle 32. The handle 32 of the bracket 42 is preferably located opposite the hinge base 15 when the lid 40 is properly positioned on the container rim 30b. As shown in FIGS. 1 and 5, the groove 34 may be formed between a top or exterior surface of the bracket 42 and a back or rear surface of the handle 32. In the preferred embodiment, the groove 34 extends across a width of the bracket 42, and may be formed at least in part as a depression in a top surface of the bracket 42. However, the groove 34 is not limited to the specific size, shape or location shown and described herein. For example, the groove 34 may be formed on a bottom or interior surface of the bracket 42. While it is preferred that the handle 32 be formed on the bracket 42, it is understood by those skilled in the art that the handle 32 and groove 34 may be formed or positioned at a different location of the kitchen appliance 10, such as on the side wall 12b of the housing 12.

At least the first end 42a of the bracket 42 is preferably rotatably and selectively removably received within at least a portion of the hinge base 15 to rotatably and selectively removably mount the lid 40 to the housing 12. The lid 40 is preferably pivotable between a closed, generally horizontal position (FIGS. 1-5), in which the lid 40 rests on and contacts the container rim 30b, and an open position (FIG. 6) approximately one hundred ten degrees therefrom. More specifically, each projection 52 of the first end 42a of the bracket 42 is preferably removably insertable into the slot 17a and the generally circular portion 17b of each channel 17 of the first portion 19 of the hinge base 15. Each projection 52 has a width that is at least slightly smaller than a corresponding with of each slot 17a, such that one of the projections 52 may pass through the slot 17a and enter the generally circular portion 17b of each channel 17. Once inside the generally circular portion 17b, the projection 52 may rotate with respect to the generally circular portion 17b, so that the bracket 42 and the lid 40 can rotate with respect to the hinge base 15 and the housing 12. When the projections 52 are positioned inside the respective generally circular portion 17b and are properly aligned with the slots 17a, the lid 40 may be removed from the housing 12 by pulling the lid 40 away from the housing 12 such that the projections 52 exit the slots 17a (see FIG. 7).

The bracket 42 is preferably formed from a polymeric material, such as, but not limited to, plastic, and is affixed to the lid 40 via one ore more (preferably two) fasteners 43, such as bolts, screws, rivets, or some other suitable fastener. Alternatively, it is contemplated that the bracket 42 could be affixed to the lid 40 using an adhesive or some other fastening method. At least a portion of an interior surface of the bracket 42 is preferably in flush or direct contact with at least a portion of the exterior surface 40a of the lid 40. As shown in FIG. 3, one or more spaced-apart gaps or spacings 64 are preferably formed between the interior surface of the bracket 42 and the exterior surface 40a of the lid 40. Moreover, while it is preferred that the bracket 42 be separately formed and removably affixed to the lid 40, the lid 40 may be made of a polymeric material, such as plastic, and that the bracket 42 may be unitarily and integrally formed with the lid 40 and permanently attached thereto.

Referring to FIGS. 1-3, 5 and 6, the kitchen appliance 10 preferably includes at least one latching mechanism 22 for selectively retaining the lid 40 in sealing engagement with the container rim 30b for inhibiting or preventing leakage of the foodstuff from within the interior 30a of the container 30. The latching mechanism 22 preferably selectively retains and/or grasps at least a portion of the handle 32 of the bracket 42. The latching mechanism 22 is generally an over-the-center clip having at least a wire hook 54 and a lever 56, and more preferably the latching mechanism 22 includes the hook 54, the lever 56 and the groove 34. It is preferred that manipulation of the lever 56 causes engagement or release of the hook 54 of the latching mechanism 22. At least a portion of the hook 54 is preferably sized and shaped to fit within and engage the groove 34. As shown in FIG. 6, the hook 54 preferably extends from one side wall of the lever 56 to an opposing side wall of the lever 56.

The latching mechanism 22 is preferably attached to the exterior surface 13 of the side wall 12b of the housing 12 proximate the top thereof, and is preferably positioned generally opposite to the hinge base 15 and above the control knob 24. However, the latching mechanism 22 may be attached to the lid 40 and/or bracket 42 if the handle 32 is attached to the exterior surface 13 of the side wall 12b of the housing 12. Preferably, the hook 54 is selectively releasably engagable with the handle 32 and/or the lid 40 with movement of the lever 56 to selectively retain the lid 40 in sealing engagement with the container rim 30b. Specifically, it is preferred that, when in an engaged position (FIGS. 1-5), the latching mechanism 22 retains the lid 40 in sealing engagement with the container rim 30b to at least slightly compress the gasket 41, and, when in a released or disengaged position (FIG. 6, for example), the hook 54 is removed from engagement with the handle 34 and/or the lid 40 so that the lid 40 can be removed from the container 30 in order to allow access to the interior 30a of the container 30. In the engaged position, it is preferred that at least a portion of the hook 54 engages and/or rests within at least a portion of the handle 32 of the bracket 42, and preferably the groove 34 of the handle 32.

When the hook 54 is placed in the groove 34, the lever 56 of the latching mechanism 22 can be rotated downwardly and inwardly toward the side wall 12b of the housing 12 to create a retaining force exerted by the latching mechanism 22 on handle 32 and/or the lid 40 in order to retain the lid 40 on the container rim 30b. To release the latching mechanism 22, the lever 56 is preferably rotated outwardly and upwardly with respect to the side wall 12b of the housing 12 to release the retaining force, thereby placing the latching mechanism 22 in an intermediate position between the engaged position and the released position. Once in this position, the hook 54 of the latching mechanism 22 can be removed from engagement with groove 34 to place the latching mechanism 22 in the released position and enable the lid 40 to be removed from engagement with the container rim 30b. Those skilled in the art understand when the preferred positioning of the latching mechanism 22 and the handle 32 are reversed, the lever 56 of the latching mechanism 22 is preferably rotated upwardly to retain the lid 40 on the container rim 30b, and downwardly to release the lid 40 from the container rim 30b.

Preferably, the latching mechanism 22 exerts a sufficient amount of retaining force on the lid 40 to at least partially compress at least a substantial portion of the gasket 41 of the lid 40 with the container rim 30b, preferably creating a sufficient seal therebetween to inhibit leakage of the foodstuff, particularly liquids, from within the interior 30a of the container 30. While it is preferred that the latching mechanism 22 be of the over-the-center type, the latching mechanism 22 may be of a different type, provided it is capable of functioning in the manner described herein. Lastly, while it is preferred that the latching mechanism 22 be in diametrically opposing relation to the hinge base 15, the latching mechanism 22 may be arranged differently with respect to the hinge base 15, provided the latching mechanism 22 is capable of functioning to retain the lid 40 in engagement with the container rim 30b such that the gasket 41 is in sealing engagement with the container rim 30b.

In use, the container 30 is preferably placed within the heating cavity of the housing 12 and foodstuff is placed within the hollow interior 30a of the container 30 for cooking, warming and/or cooling thereof. The lid 40 is then placed on the container rim 30b and the knob 24 is turned to the proper setting for heating or cooling of the foodstuff. If desired, the kitchen appliance 10 can be removed from its electrical power source (i.e., unplugged) and transported to another location. To do so, the latching mechanism 22 is preferably placed in the engaged position to create a retention force exerted by the latching mechanism 22 and at least slightly compress the gasket 41 of the lid 40 in order to retain the lid 40 in sealing engagement with the container rim 30b. In this way, the gasket 41 forms a seal between the edge of the lid 40 and the container rim 30b in order to at least inhibit spillage and/or leakage of foodstuff from within the interior 30a of the container 30 during transport or other movement of the kitchen appliance 10. When it is desired to remove the lid 40 from the container rim 30b, the lever 56 of the latching mechanism 22 is rotated to release the latching mechanism 22 so that the lid 40 can be lifted from its engagement with the container rim 30b. In this way, the kitchen appliance 10 has the capability of retaining the lid 40 in sealing engagement with the container rim 30b using the latching mechanism 22 in order to allow movement of the kitchen appliance 10 with little to no fear of the foodstuff within the kitchen appliance 10 spilling or leaking therefrom.

A preferred method of assembly the kitchen appliance 10 includes inserting the container 30 into the cavity of the housing 12. A least a portion of the bracket 42, such as the first end 42a, is preferably inserted into at least a portion of the hinge base 12, such as the first portion 19 thereof. The lid 40 is preferably rotated downwardly so as to be placed flush on the container rim 30b. The vertical positioning of the hinge base 15 may be adjusted with respect to the side wall 12b of the housing 12. For example, a screw driver (not shown) may be used to remove and/or loosen the fasteners 62 from the mounting holes 60 of the hinge base 15 and the slots 58 of the housing 12, the hinge base 15 may then be raised or lowered with respect to the housing 12, and then the fasteners 62 may be inserted once again into the corresponding mounting holes 60 of the hinge base 15 and the slots 58 of the housing 12. The hinge base 15 is preferably placed on and/or aligned with the side wall 12b of the housing 12 so that the handle 32 on the second end 42b of the bracket 42 is properly aligned and/or engaged with the latching mechanism 22. Once the hinge base 15 is attached to the side wall 12b at a desired position, at least a portion of the hook 54 of the latching mechanism 22 may be inserted into at least a portion of the groove 34 of the handle 32. The latch 56 of the latching mechanism 22 may be rotated with respect to the hook 54 to selectively retain the lid 40 on the container rim 30b.

It will be appreciated by those skilled in the art that changes could be made to the embodiment described above without departing from the broad inventive concept thereof. It is understood, therefore, that this disclosure is not limited to the particular embodiment disclosed, but it is intended to cover modifications within the spirit and scope of the present disclosure as defined by the appended claims.

We claim:

1. A kitchen appliance comprising:
   a housing having a base and a side wall extending therefrom, the side wall having an exterior surface and an opposing interior surface defining, with the base, a cavity within the housing, the housing having a housing rim at a first, free edge of the side wall defining an opening to the cavity;
   a container having a generally hollow interior and a container rim defining an opening for accessing the interior thereof, the interior of the container being capable of retaining foodstuffs therein, the container being sized and shaped to fit within the cavity of the housing;
   a lid sized and shaped to at least partially cover the opening of the container when placed on the container rim, the lid having an exterior surface and an opposing interior surface facing the interior of the container when the lid is placed on the container rim;
   a hinge base, mounted to one of the exterior surface of the side wall of the housing and the exterior surface of the lid and, a first end of the hinge base extending above the housing rim and including two spaced-apart channels on opposing exterior side walls thereof; and
   a bracket mounted to one of the exterior surface of the lid and the exterior surface of the sidewall of the housing, the bracket having two laterally spaced-apart extensions extending outwardly from a first end of the bracket, each of the two extensions including a respective projection on an interior side wall thereof and each projection being sized and shaped to be rotatably and selectively removably insertable within a respective channel of the two channels of the hinge base to rotatably and selectively removably mount the lid to the housing.

2. The kitchen appliance of claim 1, wherein at least a portion of the hinge base extends outwardly beyond the exterior surface of the side wall of the housing, and wherein at least a portion of the bracket extends outwardly beyond an outer periphery of the lid.

3. The kitchen appliance of claim 1, wherein the first end of the bracket extends outwardly beyond an outer periphery of the lid at a first location and an opposing second end of the bracket extends outwardly beyond the outer periphery of the lid at a second location diametrically opposed to the first location.

4. The kitchen appliance of claim 3, wherein the second end of the bracket includes a handle and a groove is located on the handle.

5. The kitchen appliance of claim 4, further comprising:
   at least one latching mechanism mounted to the side wall of the housing, the at least one latching mechanism being an over-the-center clip having at least a hook and a lever, wherein at least a portion of the hook is sized and shaped to fit within the groove and the lever is rotatable to create a retaining force exerted by the latching mechanism on the handle to retain the lid on the container rim.

6. The kitchen appliance of claim 1, further comprising:
   a handle on one of an end of the bracket opposite the hinge base and the side wall of the housing;
   a latching mechanism mounted to one of the side wall of the housing opposite the hinge base and the end of the bracket opposite the hinge base, the latching mechanism selectively retaining at least a portion of the handle;
   at least one slot in the exterior surface of the side wall of the housing, and
   at least one mounting hole extending through the hinge base, the slot and the mounting hole being sized and shaped to receive a fastener therethrough, the slot being vertically-elongated to allow for vertical adjustment of the hinge base with respect to the side wall of the housing.

7. The kitchen appliance of claim 1, further comprising:
   at least two laterally spaced-apart and vertically-elongated slots in the exterior surface of the side wall of the housing, wherein at least two laterally spaced-apart mounting holes extend through the hinge base, each slot corresponding to one of the mounting holes and each corresponding slot and mounting hole being sized and shaped to receive a fastener therethrough to securely attach the hinge base to the side wall of the housing.

8. A kitchen appliance comprising:
   a housing having a base and a side wall extending therefrom, the side wall having an exterior surface and an opposing interior surface defining, with the base, a cavity within the housing, the housing having a housing rim at a first, free edge of the side wall defining an opening to the cavity, the side wall including at least two circumferentially spaced-apart and vertically-elongated slots in the exterior surface thereof;
   a container having a generally hollow interior and a container rim defining an opening for accessing the interior thereof, the interior of the container being capable of retaining foodstuffs therein, the container being sized and the hinge base further shaped to fit within the cavity of the housing, a first end of the hinge base extending above the housing rim and including two spaced-apart channels on opposing exterior side walls thereof;
   a hinge base mounted to the exterior surface of the side wall of the housing and having at least two circumferentially spaced-apart mounting holes extending therethrough, each mounting hole corresponding to one of the slots in the side wall of the housing;
   a lid sized and shaped to at least partially cover the opening of the container when placed on the container rim, the lid having an exterior surface and an opposing interior surface facing the interior of the container when the lid is placed on the container rim;
   a bracket mounted to the exterior surface of the lid, the bracket having two laterally spaced-apart extensions extending outwardly from a first end of the bracket, each of the two extensions including a respective projection on an interior side wall thereof and each projection being sized and shaped to be rotatably and selectively removably insertable within a respective channel of the two channels of the hinge base to rotatably and selectively removably mount the lid to the container rim; and
   a fastener extending through each corresponding mounting hole and slot to secure the hinge base to the side wall of the housing, the vertically-elongated slots being sized and shaped to permit vertical adjustment of the hinge base with respect to the side wall of the housing.

9. The kitchen appliance of claim 8, further comprising:
   four laterally spaced-apart and vertically-elongated slots in the exterior surface of the side wall of the housing, a pair of the slots being located closer to the housing rim on the side wall of the housing than the remaining two slots.

10. The kitchen appliance of claim 9, further comprising:
a handle on one of an end of the bracket opposite the hinge base and the side wall of the housing;
a latching mechanism mounted to one of the side wall of the housing opposite the hinge base and the end of the bracket opposite the hinge base, the latching mechanism selectively retaining at least a portion of the handle.

11. The kitchen appliance of claim 8, wherein a first end of the bracket extends outwardly beyond an outer periphery of the lid at a first location and an opposing second end of the bracket extends outwardly beyond the outer periphery of the lid at a second location diametrically opposed to the first location.

12. A kitchen appliance comprising:
a housing having a base and a side wall extending therefrom, the side wall having an exterior surface and an opposing interior surface defining, with the base, a cavity within the housing, the housing having a housing rim at a first, free edge of the side wall defining an opening to the cavity;
a container having a generally hollow interior and a container rim defining an opening for accessing the interior thereof, the interior of the container being capable of retaining foodstuffs therein, the container being sized and shaped to fit within the cavity of the housing;
a lid sized and shaped to at least partially cover the opening of the container when placed on the container rim, the lid having an exterior surface and an opposing interior surface facing the interior of the container when the lid is placed on the container rim;
a gasket extending around one of an outer edge of the lid and the container rim;
a hinge base mounted to one of the exterior surface of the side wall of the housing and the exterior surface of the lid, a first end of the hinge base extending above the housing rim and including two spaced-apart channels on opposing exterior side walls thereof;
a bracket mounted to one of the exterior surface of the lid and the exterior surface of the side wall of the housing, the bracket having two laterally spaced-apart extensions extending outwardly from a first end of the bracket, each of the two extensions including a respective projection on an interior side wall thereof and each projection being sized and shaped to be rotatably and selectively removably insertable within a respective channel of the two channels of the hinge base to rotatably and selectively removably mount the lid to the housing; and
a latching mechanism mounted to one of the side wall of the housing opposite to the hinge base and a portion of the bracket opposing the hinge base, the latching mechanism being an over-the-center clip having at least a hook and a lever, the latching mechanism having an engaged position in which the gasket is in sealing engagement with at least one of the lid and the container rim to inhibit leakage of the foodstuffs from the interior of the container and a disengaged position in which the latching mechanism permits the lid to be removed from the container rim.

13. The kitchen appliance of claim 12, further comprising:
a handle on the portion of the bracket opposite the hinge base, the latching mechanism including a groove located on the handle, the groove being sized and shaped to receive at least a portion of the hook therein.

14. The kitchen appliance of claim 12, wherein the kitchen appliance is a slow cooker having a heating element disposed within the housing sufficiently proximate the cavity to heat the cavity.

15. A method of assembling a kitchen appliance comprising:
inserting a container of the kitchen appliance into a cavity of a housing of the kitchen appliance, the kitchen appliance comprising: the housing having a base and a side wall extending therefrom, the side wall having an exterior surface and an opposing interior surface defining, with the base, the cavity of the housing, at least one vertically-elongated slot located in the exterior surface of the side wall of the housing, the container having a generally hollow interior and a container rim defining an opening for accessing the interior thereof, the interior of the container being capable of retaining foodstuffs therein, a lid sized and shaped to at least partially cover the opening of the container when placed on the container rim, the lid having an exterior surface and an opposing interior surface facing the interior of the container when the lid is placed on the container rim, a bracket mounted to the exterior surface of the lid, the bracket having two laterally spaced-apart extensions extending outwardly from a first end of the bracket, each of the two extensions including a respective projection on an interior side wall thereof, a handle located on one of an end of the bracket and the side wall of the housing, a hinge base mounted to one of the exterior surface of the side wall of the housing for pivotally mounting the lid to the housing, a first end of the hinge base extending above a rim of the housing and including two spaced-apart channels on opposing exterior side walls thereof, and a latching mechanism mounted to one of the side wall of the housing and an end of the bracket opposite the hinge base;
removably inserting the respective projection of each of the two extensions of the bracket into each of the respective corresponding channels of the hinge base;
placing the lid on the container rim;
adjusting the vertical position, of the hinge base with respect to the side wall of the housing so the lid fully engages the container rim; and
inserting at least one fastener through the hinge base and into the at least one vertically-elongated slot in the side wall of the housing to properly align the handle with the latching mechanism.

16. The method of claim 15, further comprising:
inserting at least a portion of a hook of the latching mechanism into a groove of the latching mechanism; and
rotating a lever of the latching mechanism with respect to the hook to selectively retain the lid on the container rim.

* * * * *